E. MEIER.
ROLLER BEARING.
APPLICATION FILED APR. 9, 1918.

1,302,825.

Patented May 6, 1919.

Inventor.
Erling Meier

UNITED STATES PATENT OFFICE.

ERLING MEIER, OF CHRISTIANIA, NORWAY.

ROLLER-BEARING.

1,302,825.         Specification of Letters Patent.         Patented May 6, 1919.

Application filed April 9, 1918. Serial No. 227,531.

*To all whom it may concern:*

Be it known that I, ERLING MEIER, a subject of the King of Norway, residing at Christiania, in the Kingdom of Norway, have invented certain new and useful Improvements in Roller-Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a roller bearing of the kind in which rollers are provided with grooves or shoulders for preventing axial movement of the same. According to the invention one or more of the bearing members are composed of rings a number which project in front of the running surface and fit into the grooves of the rollers.

On the drawing is illustrated a form of the invention.

The rollers 1 are provided with grooves 2, and the bearing members are composed of rings 3, 4, 5, 6, etc., some of which, such as 6, project in front of the others and fit into the grooves 2 of roller 1.

Figure 1:
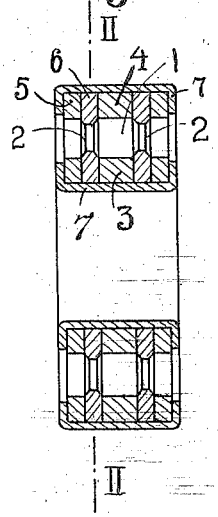
Figure 1 is an axial section through a roller bearing and Fig. 2 is a radial section on the line 2—2 of Fig. 1.
Figure 2:
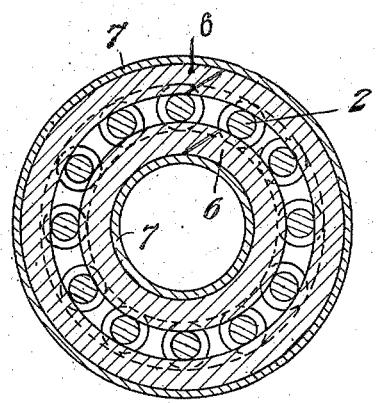

Said rings 6, as seen on Fig. 2, are slotted so that they may be slipped on to the rollers, when the bearing is assembled. The rings composing each bearing member may suitably be pressed into steel jackets 7, to keep the parts together.

One of the bearing members for instance the inner member may be solid, and the other one composed of rings as illustrated.

In assembling the bearing the rollers are first placed in or around the finished bearing member; thereupon the middle part of the other bearing is put in position and the slotted rings are slipped on from both sides. Finally the outer rings are put in position and the steel jacket is pressed on.

Figure 3:
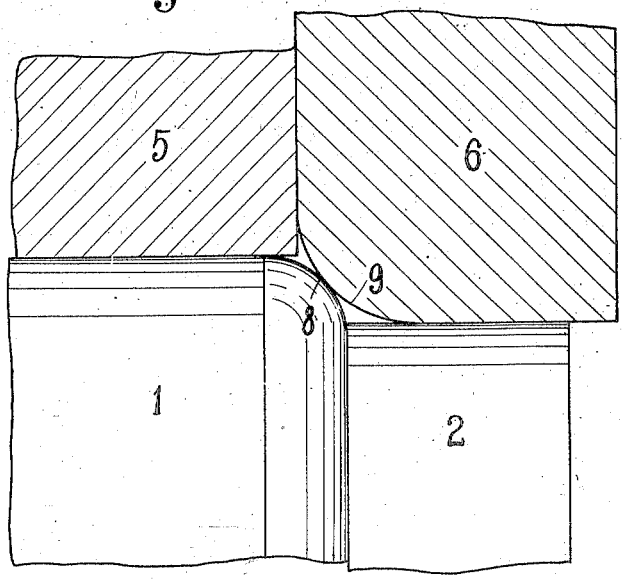
Fig. 3 is a sectional detail on a larger scale showing a modified form of the roller bearing.

As shown on Fig. 3 the edges (8, 9) on rollers and bearing rings which have to take up the axial stresses are both given a convex form, so that they only touch each other in one point.

In the form of the bearing illustrated on Fig. 3 roller 1 is not provided with grooves but only with a shoulder at each end. In this case rings 6 may be made whole.

I claim:

In a roller bearing the combination with grooved or shouldered rollers, of bearing members composed of rings, one or more of which projects in front of the bearing surface and fits into the grooves of the rollers, the coöperating edges of rollers and projecting bearing rings being given a convex form, whereby they only touch each other one point.

In testimony that I claim the foregoing as my invention, I have signed my name in presence of two subscribing witnesses.

ERLING MEIER.

Witnesses:
C. NORMAN,
C. FABRICIUS HANSEN.